United States Patent [19]

Cyr

[11] Patent Number: 5,426,617
[45] Date of Patent: Jun. 20, 1995

[54] LONG BASELINE TRACKING SYSTEM

[75] Inventor: Reginald J. Cyr, Santa Barbara, Calif.

[73] Assignee: The United States of America as represented by the Secretary of the Navy, Washington, D.C.

[21] Appl. No.: 566,691

[22] Filed: Jul. 24, 1990

[51] Int. Cl.[6] .......................... G01S 15/00; H04B 1/59
[52] U.S. Cl. ........................................ 367/6
[58] Field of Search ........................ 367/2-6, 367/118, 124, 131, 134, 127

[56] References Cited

U.S. PATENT DOCUMENTS

| | | | |
|---|---|---|---|
| 3,517,378 | 6/1970 | Barrett | 367/2 |
| 4,555,779 | 11/1985 | Roberts | 367/6 |
| 4,635,236 | 1/1987 | Roberts | 367/6 |
| 4,939,702 | 7/1990 | Murphree | 367/87 |

*Primary Examiner*—Daniel T. Pihulic
*Attorney, Agent, or Firm*—John Tarlano

[57] ABSTRACT

A method for reliably locating the position of a submerged submarine with respect to a surface ship. A multiple number of transponders are placed at known locations near the sea floor, in the area of the ship and the submarine. One transponder has a dual function both as a response transponder and as a relay transponder. The other transponders have a single function as response transponders. Elapsed times between transmission of a first acoustic transmission pulse from the ship and receptions of first acoustic response pulses coming from the transponders, are measured at the ship. Elapsed times between transmission of a second acoustic pulse from the ship, its relay through the relay transponder, a response to the relayed signal by the submarine and then responses to the submarine's response pulse by the transponders, are also measured at the ship. These elapsed times are used to determine distances between the ship and the transponders, and distances between the transponders and the submarine. The location of the ship and the location of the submarine, with respect to the transponders, are determined from the distances.

3 Claims, 3 Drawing Sheets

LONG BASELINE TRACKING SYSTEM

BACKGROUND OF THE INVENTION

In the past, an attempt to determine distance between a surface ship and a shallowly submerged submarine depended on direct communication between the ship and the submarine. However due to changing density of water between the ship and the submarine, due to varying thermal, pressure and salinity characteristics of the water, the acquisition range of the submarine by the ship was variable and thus unreliable. Indeed, acoustic waves from the ship might not reach the submarine. Such acoustic waves might be refracted downward into a deep sea, or upward to a surface of a sea, by water between the ship and the submarine. Thus there was no direct reliable acoustic path between the ship and the submarine.

A reliable acoustic path is an acoustic transmission path which is not destroyed by changing thermal, pressure and salinity characteristics of the water between the ship and the submarine. There are reliable acoustic paths vertically, or nearly vertically, in a sea.

In the present invention an array of transponders is used to communicate between a surface ship and a shallowly submerged submarine. The array of transponders is placed near the bottom of the sea, between the ship and the submarine, such that each transponder is on a reliable acoustic path of the ship and such that the submarine is on a reliable acoustic path of each transponder.

In the present invention each of several transmissions is made nearly vertically, between two points in the sea, and thusly on a reliable acoustic path. A transmission is made along a reliable acoustic path from a ship to each of several transponders that are downward of the ship. Another transmission is made along a reliable acoustic path from each of the transponders to the ship. Another transmission is made along a reliable acoustic path from one of the transponders to a submarine that is upward of the transponders. Another transmission is made along a reliable acoustic path from the submarine to each of the transponders that are downward of the submarine. Such reliable acoustic paths are reliable because they are sensitive neither to near-surface-effects nor to the varying losses on reflection that characterize bottom-bounce propagation.

From a point at or near the surface of the sea there are reliable acoustic paths downward. These reliable acoustic paths have comparable transmission losses. For the ship, the reliable acoustic paths that extend downward define an approximately sinusoidal curve, whose upper peaks touch at the surface of the sea beginning at the ship, and whose lower peaks touch the bottom of the sea. For the submarine, the reliable acoustic paths that extend downward define an approximately sinusoidal curve, whose upper peaks touch at the surface of the sea, except for the peak that begins at the submarine, and whose lower peaks touch the bottom of the sea. There is a first such sinusoidal curve for the ship and a second such sinusoidal curve for the submarine.

From a point at or near the bottom of the sea there are reliable acoustic paths upward. These reliable acoustic paths have comparable transmission losses. For each of the transponders the reliable acoustic paths that extend upward, define an approximately sinusoidal curve, whose lower peaks touch the bottom of the sea, except for the peak that begins at a transponder, and whose upper peaks touch the surface of the sea. There is a sinusoidal curve for each of the transponders. These latter sinusoidal curves merge when the transponders are close to each other. These merged curves may be thought of as a third sinusoidal curve.

The first and third sinusoidal curves can be made to overlap, thus producing areas in which the ship and transponders may be positioned whereby the ship can communicate with the transponders and the transponders can communicate with the ship. The second and third sinusoidal curves can be made to overlap, thus producing areas in which the submarine and transponders may be positioned whereby the submarine can communicate with the transponders and the transponders can communicate with the submarine.

The array of transponders used in the present invention allows the position of the submarine, with the respect to the transponders, to be determined by the ship. The transponders of the present invention overcome interference problems, and allow the ship to determine the distance between the ship and the submarine, by using appropriate reliable acoustic paths. The distance between the ship and the submarine can be accurately determined.

The long baseline tracking system of the present invention operates in two steps, also known as two modes. In a first normal mode the distances between a ship and the array of transponders are determined. The position of the ship relative to the array of transponders is plotted. In a second relay mode the distances between the submarine and the array of transponders are determined. The position of the submarine with respect to the array of transponders is plotted. The position of the submarine with respect to the ship may be determined from the plots.

SUMMARY OF THE INVENTION

A long baseline system is disclosed that comprises first means for transmitting first information, second means that is on a reliable acoustic path of the first means, for receiving said first information from the first means and for transmitting second information based on the first information, and third means on a reliable acoustic path of the second means, but not on a reliable acoustic path of the first means, for reliably receiving the second information from the second means even though the first information from the first means cannot be reliably received by the third means.

DESCRIPTION OF THE PREFERRED EMBODIMENT

Figure 1:
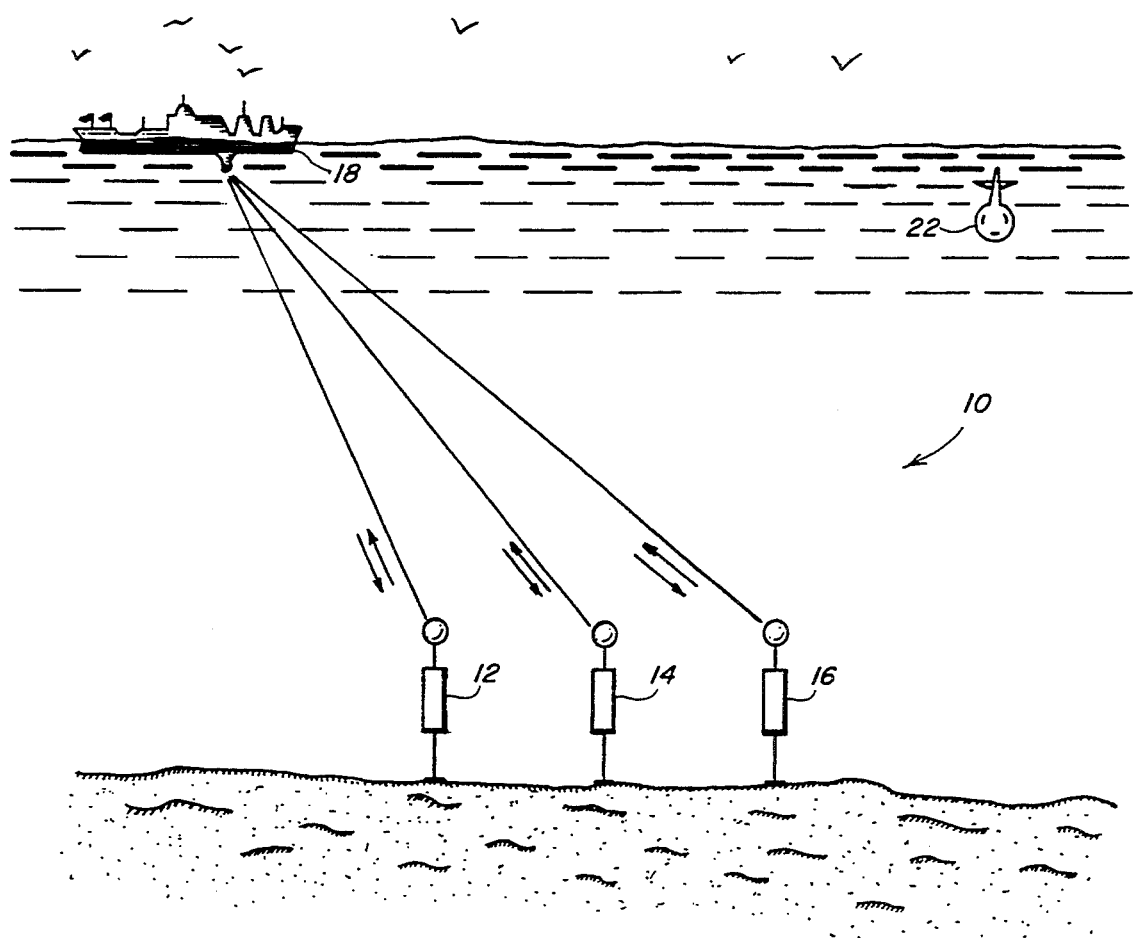
FIG. 1 shows a use of the disclosed system, in determining positions of transponders with respect to a ship.

In FIG. 1, a long baseline tracking system is shown. The system uses an array 10 of three transponders 12, 14, and 16 located at or near the bottom of the sea. The geographical position of each of the transponders on the bottom of the sea is known. The information as to their positions may be gathered during their deployment in the sea. FIG. 1 also shows a ship 18 in relation to the transponders 12, 14 and 16. The ship 18 is on the surface 20 of the sea. A submarine 22 is also shown in the sea in relation to the transponders.

The transponders 12, 14, and 16 lay on reliable acoustic paths of the ship 18. On the reliable acoustic paths of ship 18, acoustic waves will reliably travel from the ship 18 to the transponders 12, 14 and 16 and thus they will reliably reach from ship 18 to these transponders. The ship's reliable acoustic paths are below a sinusoidal curve 19 shown in FIG. 3.

The ship 18 lays on reliable acoustic paths of transponders 12, 14, and 16. Acoustic waves from transponders 12, 14 and 16 will reliable reach from these transponders to the ship 18. These transponders' reliable acoustic paths are above sinusoidal curve 23 shown in FIG. 3.

Further, the submarine 22 also lays on reliable acoustic paths of transponders 12, 14, and 16. Acoustic waves from transponders 12, 14, and 16 will reliably reach from these transponders to the submarine 22. These transponders' reliable acoustic paths are also above sinusoidal curve 23 shown in FIG. 3.

Still further, the transponders 12, 14, and 16 lay on reliable acoustic paths of the submarine 22. Acoustic waves from submarine 22 will reliable reach from the submarine 22 to the transponders. The submarine's reliable acoustic paths are under a sinusoidal curve 21 shown in FIG. 3.

Figure 2:
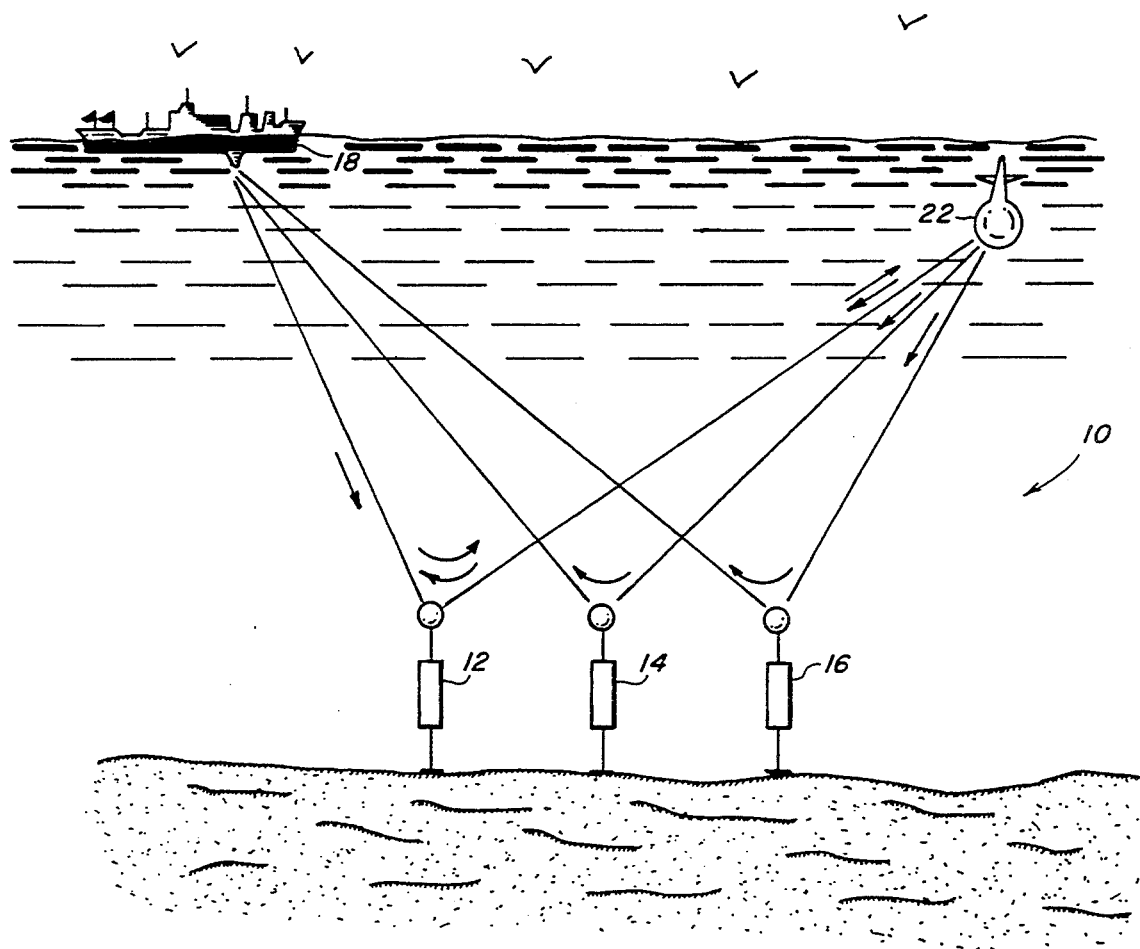
FIG. 2 shows the disclosed system, in determining a position of a submarine with respect to transponders.
Figure 3:
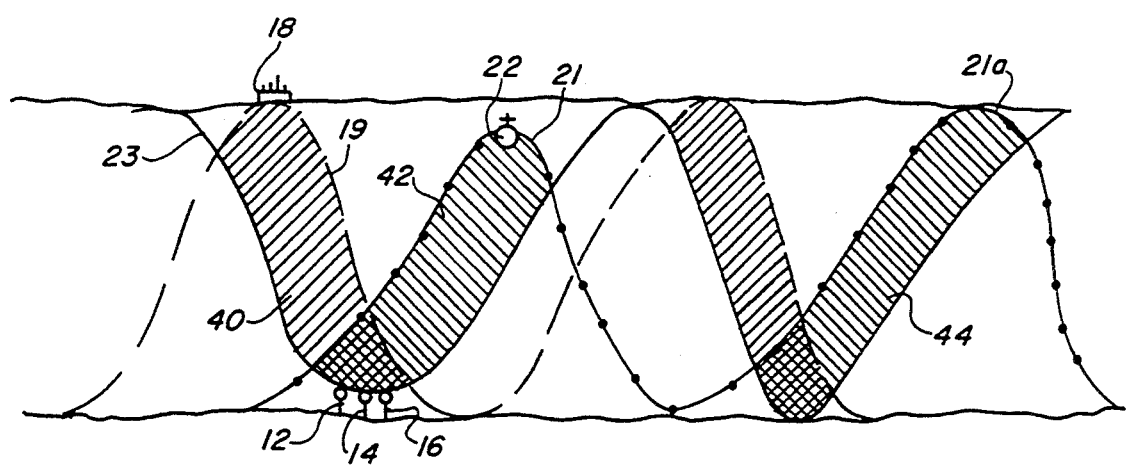
FIG. 3 shows three sinusoidal curves that define outer limits of reliable acoustic paths for a ship, a submarine and bottom moored transponders.

FIG. 3 shows a positioning of curves 19, 21 and 23 with respect to each other. In this example, there is a region 40 of reliable acoustic paths between ship 18 and transponders 12, 14 and 16. FIG. 3 also shows, by example, a region 42 of reliable acoustic paths between transponders 12, 14, 16, and submarine 22. Since regions 40 and 42 overlap, the long baseline tracking system of FIG. 3 will allow for communication between ship 18 and submarine 22 through transponders 12, 14 and 16. There can be many other positionings of curves 19, 21, 23 with respect to each other, that will allow for indirect communication between ship 18 and submarine 22, and thus for alternate configurations of a long baseline tracking system other than shown in FIGS. 1 and 2.

Further, should submarine 22 alternately be operated within the region 44 of FIG. 3, it would be on reliable acoustic paths of the transponders 12, 14 and 16, as they are shown in their positions in FIG. 3. This is because of the repeating nature of the sinusiodal curves shown and thus these curves repeating overlapse. Therefore submarine 22 could be acquired in such a region 44. There are other progressively further regions outward from ship 18 and transponders 12, 14 and 16, wherein submarine 22 may be acquired.

In FIG. 1, a first interrogate sonar pulse is sent out in a 360 degree beam from sonar transmitter-receiver equipment on ship 18. The first sonar interrogate pulse from ship 18 will reach a transponder 12 firstly. A response sonar pulse will come back to ship 18, and be received by sonar transmitter-receiver equipment on ship 18, firstly from transponder 12. Transponder 12 is known as a relay transponder. The sonar pulse from ship 18 will reach transponder 14 secondly. A response sonar pulse will come back to ship 18 secondly from transponder 14. Transponder 14 is known as a response transponder. A sonar pulse from ship 18 will reach transponder 16 thirdly. A response sonar pulse will come back to ship 18 thirdly from transponder 16. Transponder 16 is known as a response transponder. Due to the frequencies of these above mentioned pulses, submarine 22 will not respond to these transponder pulses.

The position of the submarine 22 with respect to the ship 18 is determined at the ship 18. This is done in two steps. The first step, the normal mode, the distances D1, D2 and D3 between the ship 18 and each transponder 12, 14 and 16 are determined using normal-mode-generated data. In the second step, the relay mode, the distances D4, D5 and D6 between transponders 12, 14 and 16 and the submarine 22 are determined, using relay-mode-generated data.

In a normal mode, the transponders 12, 14 and 16 react to a first interrogate pulse sent out from the ship 18. Each transponder 12, 14 and 16 immediately transmits a response pulse toward the ship 18. Each response pulse is at a different frequency with respect to both the other response pulse and the first interrogate pulse. The time delays between the first interrogate pulse and the response pulses are measured by the ship 18. These time delays are times T1, T2 and T3.

In the normal mode a first interrogate pulse at a selected frequency is transmitted toward all of the transponders. Each transponder responds to the first interrogate pulse. Each transponder thus sends out a response pulse. Each response pulse is at a different frequency. The ship detects the time of arrival of each of the response pulses. The time differences, T1, T2 and T3 between the time of transmission of the first interrogate pulse and times of arrival of each of the response pulses, are measured. They are used to calculate the distances between the ship and each of the transponders.

A first measured time difference is T1. The velocity of sound in water is V. A distance D1 from the ship 18 to the first transponder 12 is determined using the formula $D1 = \frac{1}{2}(V)(T1)$. The time of travel of sound from the ship 18 to the first transponder 12 is known as t1. $t1 = \frac{1}{2}(T1)$. The time of travel of sound from the first transducer 12 to the ship 18 is also known as t1.

The distances to the other transponders from the ship 18 are determined in a similar manner. A second measured time difference is T2. A distance D2 from the ship 18 to the second transponder 14 is determined using the formula $D2 = \frac{1}{2}(V)(T2)$. The time of travel of sound from the ship 18 to the second transponder 14 is known as t2. $t2 = \frac{1}{2}(T2)$. The time of travel of sound from the second transducer 14 to the ship 18 is also t2. A third measured time difference is T3. A distance D3 from the ship 18 to the third transponder 16 is determined using the formula $D3 = \frac{1}{2}(V)(T3)$. The time of travel of sound from the ship 18 to the third transponder 16 is known as t3. $t3 = \frac{1}{2}(T3)$. The time of travel of sound from the third transducer 16 to the ship 18 is also t3.

In the normal mode, once the three distances D1, D2 and D3 are determined, the position of the ship with respect to the array of transponders is plotted. A sphere with a diameter equal to the calculated distance from a particular transponder to the ship, is drawn around that particular transponder. This step is performed for three such transponders. Three such spheres are drawn around the three transponders. The point of intersection above the surface of the sea, of the three spheres is the position of the ship relative to those three transponders.

FIG. 2 shows the operation of ship 18, transponders 12, 14 and 16, and submarine 22, in the relay mode.

Transponder 12 has a dual function. Transponder 12 can function as a response transponder, as described above. Transponder 12 can also function as a relay transponder. Transponders 14 and 16 do not so function. The relay transponder 12 has a special use in connection with the relay mode. Transponder 12 can generate a relay pulse, to which a transponder on submarine 22 is responsive. The transponder 12 generates a relay pulse in response to a second interrogate pulse from the ship 18. The other transponders 14 and 16 do not respond to the second interrogate signal from the ship 18, due to the frequency of the second interrogate pulse. The relay pulse from relay transponder 12 can be identified by the submarine 22, by the relay pulse's frequency. The transmitter-receiver equipment on ship 18 does not respond to the relay pulse, due to the frequency of the relay pulse. The distance D1, between the ship 18 and the relay transponder 12, is known from a calculation described above.

In the relay mode, transponder 12 generates an relay pulse in response to a second interrogate pulse from the ship 18. The submarine 22 is responsive to the relay pulse. The transponder on submarine 22 immediately transmits a third interrogate pulse, that is equivalent to the first interrogate pulse, toward the transponders 12, 14, and 16. Each transponder 12, 14 and 16 immediately transmits a transponder response pulse toward the ship, in response to this third interrogate pulse. Each transponder response pulse is at a difference frequency with respect to the other transponder response pulses. The times that elapse between transmission of the second interrogate pulse by ship 18 and receiption of the transponder response pulses by ship 18, are measured by ship 18. These are times T4, T5, and T6.

In the relay mode, as shown in FIG. 2, a second interrogate pulse, at a frequency different than the first interrogate pulse, is sent out toward the array of transponders 12, 14 and 16, from ship 18. Only one particular transponder, a relay transponder 12, responds to this second interrogate pulse. This transponder 12 is known as the relay transponder. The relay transponder 12 responds at a relay pulse's frequency which is different than the transponder response pulses' frequencies in the normal mode.

In the relay mode, the submarine will respond to the relay pulse' signal frequency from the relay transponder and will immediately send out a third interrogate pulse that is the same as the first interrogate pulse. The third interrogate pulse from the submarine is the same as the first interrogate pulse from the ship, that was used in the normal mode. Each of the transponders 12, 14 and 16 responds to the third interrogate pulse from the submarine 22, by sending out a transponder response pulse. The transponder response pulses, used in the relay mode, are the same as the transponder response pulses used in the normal mode. The array of transponders thus responds to the third interrogate pulse from the submarine 22, in the relay mode, in the same way that the array of transponders responds to the first interrogate pulse from ship 18, in the normal mode.

The ship 18 detects each of the transponder response pulses from the array 10 of transponders. The ship 18 measures the time delays between transmission of the second interrogate pulse and receiption of the transponder response pulses.

In the relay mode the time delay between transmission of the second interrogate pulse from the ship 18 and the receiption of a transponder response pulse from each of the transponders 12, 14 and 16 is measured. These delay times can be used to determine the distance D4, D5 and D6 between the transponders 12, 14 and 16 and the submarine 22.

A first measured delay time, in the relay mode, is designated as T4. T4 consists of the time t1 of travel of the second interrogate pulse from the ship 18 to the relay transponder 12, the time t4 of travel of a relay pulse from relay transponder 12 to the submarine 22, the time t4 of travel of a third interrogate pulse from submarine 22 to the first transponder 12, and the time t1 of travel of the transponder response pulse from the relay transponder 12 to the ship 18. $T4=t1+t4+t4+t1$. Therefore $t4=\frac{1}{2}\{T4-(t1+t1)\}$. Time $t1+t1$ is equal to T1. T1 is known from the measurement of T1 in the normal mode. Therefore $t4=\frac{1}{2}(T4-T1)$. Since $D4=V(t4)$, then $D4=\frac{1}{2}V(T4-T1)$. D4 is the distance from the relay transponder 12 to the submarine 22.

A second measured time, designated T5, equals the time t1 of travel of the second interrogate pulse from the ship 18 to the relay transponder 12, time t4 of travel of the relay pulse from the relay transponder 12 to the submarine 22, the time t5 of travel of the third interrogate pulse from the submarine 22 to the second transponder 14 and the time t2 of travel of the second transponder response pulse from the second transponder 14 to the ship 18. Time $T5=t1+t4+t5+t2$. Therefore $t5=T5-t1-t4-t2$. t1 and t2 are known from measurements of T1 and T2 in the normal mode. t4 is known from the above described measurement in the relay mode. $t1=\frac{1}{2}(T1)$. $t4=\frac{1}{2}(T4-T1)$. $t2=\frac{1}{2}(T2)$. Therefore $t5=T5-\frac{1}{2}(T4+T2)$. Since $D5=V(t5)$, then $D5=V\{T5-\frac{1}{2}(T4+T2)\}$. D5 is the distance from the transponder 14 to the submarine 22.

A third measured time, designated T6, equals the time t1 of travel of the second interrogate pulse from the ship 18 to the relay transponder 12, time t4 of travel of the relay pulse from the relay transponder 12 to the submarine 22, the time t6 of travel of the third interrogate pulse from the submarine 22 to the third transponder 16 and the time t3 of travel of the third transponder response pulse from the third transponder 16 to the ship 18. Time $T6=t1+t4+t6+t3$. Therefore $t6=T6-t1-t4-t3$. t1 and t3 are known from measurements of T1 and T3 in the normal mode. t4 is known from the above described measurement in the relay mode. $t1=\frac{1}{2}(T1)$. $t4=\frac{1}{2}(T4-T1)$. $t3=\frac{1}{2}(T3)$. Therefore $t6=T6-\frac{1}{2}(T4+T3)$. Since $D6=V(t6)$, then $D6=V\{T6-\frac{1}{2}(T4+T3)\}$. D6 is the distance from the transponder 16 to the submarine 22.

With these three distances D4, D5 and D6, three spheres can be drawn around the three transponders 12, 14, and 16 for the three distance between the three transponders and the submarine 22. The point of intersection of these spheres gives the position of the submarine 22 with respect to these three transponders. Once both the position of the ship 22 with respect to the three transponders has been determined, and the position of the submarine 22 with respect to the three transponders 12, 14 and 16 has been determined, and since the positions of the three transponders on the earth are known, the position of each of the ship 18 and the submarine 22, with respect to the earth, is known.

While the present invention has been disclosed in connection with the preferred embodiment thereof, it should be understood that there may be other embodiments which fall within the scope of the invention as defined by the following claims.

What is claimed is:

1. A long baseline tracking system, comprising:

(a) first means for transmitting an interrogate pulse selected from a set comprising a first interrogate pulse and a second interrogate pulse and for receiving a transponder response pulse;

(b) second means that is on a reliable acoustic path of the first means, for reliably receiving a first interrogate pulse and transmitting a transponder response pulse in response to the first interrogate pulse, and for reliably receiving a second interrogate pulse and transmitting a relay pulse in response to the second interrogate pulse;

(c) third means that is on a reliable acoustic path of the second means but not on a reliable acoustic path of the first means, for reliably receiving the relay pulse from the second means even though an interrogate pulse from the first means cannot be reliably received, and for transmitting a third interogate pulse that is equivalent to the first interrogate pulse, in response to the relay pulse; and (d) a multiple number of response transponder means, on reliable acoustic paths of the first means and on reliable acoustic paths of the third means, each response transponder means for receiving a first interrogate pulse from the first means and for receiving a third interrogate pulse from the third means, and for transmitting a transponder response pulse in response to the first and third interrogate pulse.

2. A method for communicating between a ship and a transponder that is on a reliable acoustic path of the ship and for communicating between the transponder and a submarine that is on reliable acoustic path of the transponder, comprising:

(a) transmitting, from the ship, an interrogate pulse to the transponder;

(b) transmitting a relay pulse from the transponder to the submarine, in response to the interrogate pulse;

(c) transmitting another interrogate pulse from the submarine to the transponder, in response to the relay pulse;

(d) transmitting a transponder response pulse from said transponder, in response to the other interrogate pulse; and (e) receiving, at the ship, said transponder response pulses.

3. A method for determining first distances between a ship and transponders that are on reliable acoustic paths of the ship, and for determining second distances between the transponders and a submarine that is on reliable acoustic paths of the transponders, comprising:

(a) transmitting, from the ship, a first interrogate pulse to the transponders;

(b) transmitting a first transponder response pulse from each transponder in response to its receipt of the first interrogate pulse;

(c) receiving, at the ship, the first transponder response pulses;

(d) determining, at the ship, a first set of delay times, each delay time being between time of transmission of the first interrogate pulse and time of receipt of a first transponder response pulse;

(e) determining, at the ship, first distances between said transponders and said ship, based on said first set of delay times;

(f) transmitting, from the ship, a second interrogate pulse to the transponders;

(g) transmitting a relay pulse from one of said transponders to the submarine, in response to its receipt of the second interrogate pulse;

(h) transmitting a third interrogate pulse, equivalent to the first interrogate signal, from the submarine to said transponders, in response to the relay pulse;

(i) transmitting a second transponder response pulse from each of said transponders, in response to the third interrogate pulse;

(j) receiving, at the ship, a second set of transponder response pulses, one pulse from each transponder that is responsive to the third interrogate pulse;

(k) determining, at the ship, a second set of delay times, each delay time being between time of transmission of the second interrogate pulse and time of receipt of a transponder response pulse of the second set; and (l) determining, at the ship, second distances between said transponders and said submarine, based on said first and second sets of delay times.

* * * * *